United States Patent [19]

Ooki et al.

[11] 4,409,508

[45] Oct. 11, 1983

[54] BRUSH HOLDER WITH COATED CLAMP FOR DYNAMO-ELECTRIC MACHINE

[75] Inventors: Norihiro Ooki, Katsuta; Noriyoshi Takahashi, Hitachi; Yasuyuki Wachi, Takahagi; Yoshio Takikawa, Hitachi; Norio Yamakawa, Ibaraki; Shoji Motegi, Hitachi, all of Japan

[73] Assignees: Hitachi, Ltd.; Hitachi Chemical Company, Ltd., both of Tokyo, Japan

[21] Appl. No.: 375,102

[22] Filed: May 5, 1982

[30] Foreign Application Priority Data

May 11, 1981 [JP] Japan .................................. 56-69415

[51] Int. Cl.[3] .............................................. H02K 13/00

[52] U.S. Cl. ...................................... 310/239; 310/45; 310/242; 310/246

[58] Field of Search ........ 310/220, 228, 235, 238-245, 310/246, 247, 248, 42

[56] References Cited

U.S. PATENT DOCUMENTS 3,521,102 7/1970 Sen ...................................... 310/246
3,863,085 1/1975 Shapiro et al. ....................... 310/242
3,902,088 8/1975 Guglielmo .......................... 310/246
3,983,432 9/1976 Rankin .

*Primary Examiner*—J. D. Miller
*Assistant Examiner*—D. L. Rebsch
*Attorney, Agent, or Firm*—Antonelli, Terry & Wands

[57] ABSTRACT

A brush holder for dynamo-electric machine has the following parts: a brush making sliding contact with the surface of a rotary collector; a stationary holder part fixed to the stationary part of the dynamo-electric machine opposite to the collector; and a detachable holder part detachably secured to the stationary holder part and holding the brush when separated from the stationary holder part, the detachable holder part being provided with a retainer that clamps the brush when the detachable holder part is separated from the stationary holder part and unclamps the brush when it is attached to the stationary holder part, the brush clamping portion and the portion of the retainer therearound being coated with a coating film of a material having a friction coefficient smaller than the material of the retainer. This arrangement obviates various unfavorable phenomena such as jumping of the brush, sparking on the sliding surface, cracking in the brush and so forth.

7 Claims, 9 Drawing Figures

BRUSH HOLDER WITH COATED CLAMP FOR DYNAMO-ELECTRIC MACHINE

BACKGROUND OF THE INVENTION

The present invention relates to an improvement in the brush holder of dynamo-electric machine and, more particularly, to an improvement in a brush holder constructed to permit the replacement of a brush even when the electro-dynamic machine is operating. Still more particularly, the invention is concerned with an improvement of a brush holder having a holder part detachable together with a brush, and provided with a brush retainer for retaining the brush.

In the conventional dynamo-electric machines, the brush holders are fixed to the stationary side of the machine so that the replacement of the brush cannot be made without stopping the dynamo-electric machine. In recent years, there have been proposed various types of brush holders constructed to permit the withdrawal of the brushes even when the dynamo-electric machine is operating. Such brush holders are proposed, for example, in Japanese Patent Laid-open Nos. 125055/1980 and 162859/1980.

In these known arrangements, the whole or a part of the holder is detachable together with the brush held by the holder, and the detachable part of the brush holder is provided with a brush retainer for retaining the brush therein during handling of the brush holder, as well as a spring for pressing the head portion of the brush.

The brush holder constructed as above permits the replacement of the brush without stopping the dynamo-electric machine and, hence, is quite advantageous. However, as a result of a controlled check of conductivity of the brush holders for a long period, the brush holder of the kind described has proved to have the following disadvantage. Namely, in the detachable brush holder of the kind described, there is an appreciable tendency of the brush to jump during long use, as compared with the conventional brush holder that is wholly fixed to the stationary part. This in turn tends to promote sparking on the sliding surface of the collector (slip ring or commutator) to adversely affect the collecting characteristics and causes troubles, such as cracking of the brush.

SUMMARY OF THE INVENTION

Accordingly, an object of the invention is to provide a brush holder of the kind described, i.e. a brush holder having a detachable part, capable of eliminating the above-described problems of the prior art such as sparking on the sliding surface of the collector, cracking of the brush and so forth.

In order to achieve this object, the present inventors have made an intense study to discover the reason why the above-mentioned troubles tend to occur in the brush holder of the kind described, and have found out that the cause can be obviated by constructing the brush holder in the manner explained below.

More specifically, the inventors have found that the above-mentioned troubles are closely and primarily related to the retainer for retaining the brush in the brush holder. With this knowledge, the inventors propose to provide a coating layer of a material having a small coefficient of friction on the brush-clamping end and the portion around this end of the brush retainer.

DESCRIPTION OF THE PREFERRED EMBODIMENTS

Figure 1:
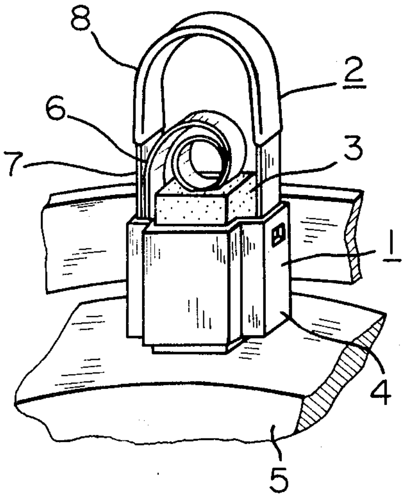
FIG. 1 is a perspective view of a brush holder in accordance with an embodiment of the invention.

The invention will be fully understood from the following description of the preferred embodiment taken in conjunction with the accompanying drawings. Before turning to the description of the embodiments, an explanation will be made herein as to the result of a study made by the inventors to find out the cause of the troubles mentioned before.

For comparing the brush holder having a detachable part with the conventional brush holder that is wholly fixed to the stationary side of the dynamo-electric machine, tests were conducted in various combinations to examine the difference in the vibration characteristics attributable to the difference in the construction and fixing method. As a result, however, no substantial difference was observed between these two types of brush holders. However, the following fact was confirmed through an impact test simulating the attaching and detaching of the brush and various long-term tests such as a heat cycle test.

More specifically, in the brush holder of the type concerned, the detachable holder part is provided with a retainer for retaining the brush therein when carried or handled together with the brush. Since the retainer is adapted to retain the bottom of sliding surface of the brush, the retainer is disposed at a portion of the detachable holder part adjacent to the brush, and is shaped in a form substantially like an L for retaining the brush. During operation of the dynamo-electro machine, therefore, the end portion of the retainer is positioned in the vicinity of the sliding portion of the collector, e.g. a slip ring in the case of an A.C. generator or motor. This arrangement causes the following problems.

Namely, partly because the retainer is positioned in the vicinity of the slip ring contacted by the brush, and partly because the air from an external cooling fan for cooling the brushes stagnates around the retainer, the powders of brush material ground from the brush and the dust particles conveyed from the outside by the cooling air are liable to deposit to the portion around the L-shaped bend of the retainer. In view of the mechanical strength and the workability, a material from the iron group is most popularly used as the material of the retainer. The retainer, therefore, is magnetized during operation of the dyamo-electric machine due to the electric current in the latter. This inconveniently promotes the tendency of deposition of the fine iron powders suspended by the air to the retainer of the detachable holder part. This problem is not so serious in a dynamo-electric machine of comparatively short operating duration, because, in such a case, the inspection of the brush and, hence, the removal of powders of brush material and dust can be made frequently. However, in the case of dynamo-electric machines operated continuously for over a long term and having a multiplicity of brushes, such as a turbine generator of large capacity, a large amount of powders attach to each retainer when the machine operates a long time. The powders depositing on the retainer are gradually moistened by the moisture in the air coming from the outside and heated so as to harden and to stick to the retainer. The deposition is then separated or dropped, as a result of vibration during rotation of the slip ring, so that it falls onto the surface of the slip ring, i.e. onto the portion making sliding contact with the brush. The cyclic attaching, deposition, solidification and dropping of the powders takes place repeatedly in all of the brushes, and the solid foreign matter soon bites into the sliding surface of the brush, thereby promoting rapid wear and sparking, and resulting in a roughing of the slip ring surface, cracking of the brush and other serious troubles.

These problems of the prior art, however, are completely overcome by the present invention, as will be understood from the following description of the preferred embodiments.

Figure 2:
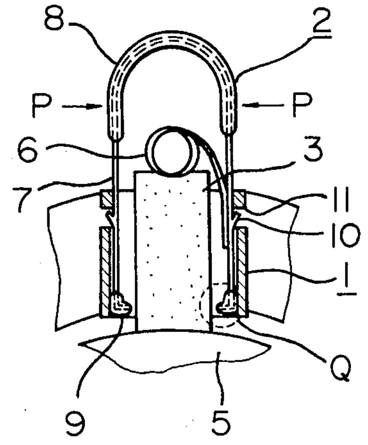
FIG. 2 is a sectional view of the brush holder shown in FIG. 1.
Figure 3:
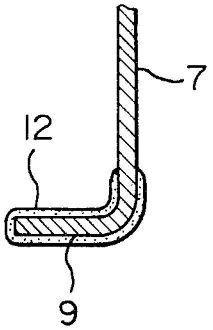
FIG. 3 is a sectional view of a portion marked at Q in FIG. 2 and showing paticularly a retainer.

Referring to FIGS. 1 and 2 showing the simplest form of the brush holder of the kind described, the brush holder assembly as a whole, generally consists of a stationary holder part 1, detachable holder part 2 and a brush 3. The stationary holder part 1 is constituted by a brush box 4, while the detachable holder part 2 is constituted by a brush spring 6, which resiliently presses the brush 3 onto the slip ring 5 during operation, and a substantially U-shaped support member 7 that supports the spring 6 and is detachably secured to the brush box 4. The detachable holder part 2 is further provided, at the U-shaped curved portion of the support 7 thereof, with an insulation film 8 for protecting the worker against electric shock. In addition, a substantially L-shaped retainer 9 is provided on the end of each leg of the U-shaped support 7, for retaining the brush in the support during transportation or handling. Reference numerals 10 and 11 denote parts which constitute a latch between the detachable holder part 2 and the stationary holder part 1. More specifically, in the illustrated embodiment, 10 denotes a latch projection formed on a portion of the support 7, while 11 denotes a latch hole formed in each side wall of the brush box 4 and adapted to cooperate with corresponding latch projection 10. The latching and unlatching are made in a manner explained below. Namely, for unlatching, it suffices only to press the support 7 at a portion thereof near the bent portion as shown by arrows P. By so doing, the substantially U-shaped support 7 is deformed resiliently to decrease the distance between the two legs so as to permit the latching projections 10 to come out of the latching holes 11. For latching the detachable holder part to the stationary holder part, the substantially U-shaped support 7 is simply pressed in the direction opposite to the direction of the arrows P.

The retainers 9 formed on the ends of legs of the support are constructed as follows. Namely, the surface of the portion of the retainers clamping the brush and thereabout are covered by a coating film 12 of a material having a small coefficient of friction such as ethylene tetrafluoride resin, epoxy resin or the like.

The small coefficient of friction of the coating film 12 on the retainer 9 permits an easy slipping of the powders of brush material and dust particles so that the undesirable deposition of a mass of powders, which inevitably takes place in the conventional arrangement, is avoided advantageously. In consequence, the unfavourable influence on the brush sliding surface, i.e. jumping of the brush, sparking on the sliding surface, cracking of the brush and so forth are suppressed remarkably.

Figure 4:
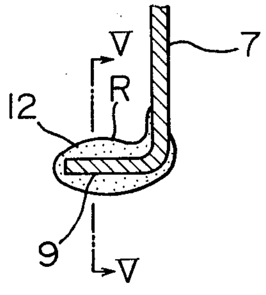
FIG. 4 is a sectional view corresponding to FIG. 3 but showing another embodiment.
Figure 5:
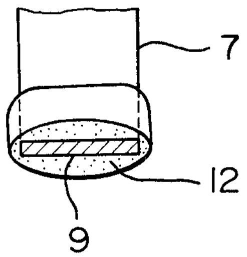
FIG. 5 is a sectional view taken along the line V—V of FIG. 4.

A higher effect is obtained by forming the coating layer on the retainer 9 in the following manner. Namely, it is advisable to form the coating layer to have a rounded surface R, as shown in FIGS. 4 and 5. By so doing, the tendency of slipping of the powders of brush material and the dust particles is further increased to further suppress the deposition of powders and particles on the retainer. It is also suggested that the end of the retainer 9, which is closet to the source of generation of the powders, is rounded at a curvature as large as possible.

Although the invention has been described through a brush holder of a specific form, needless to say, the invention can apply to any known brush holder provided that it has a similar retainer.

Figure 6:
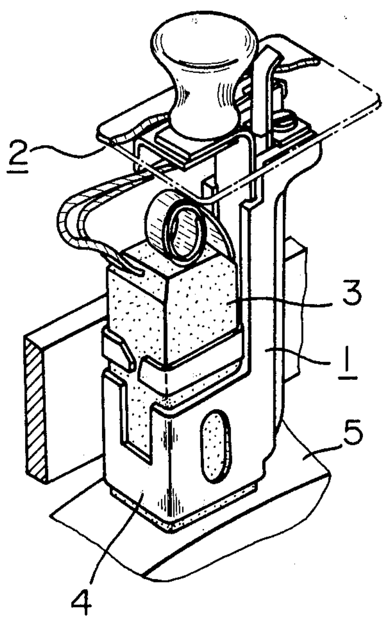
FIG. 6 is a perspective view of a brush holder in accordance with another embodiment of the invention.
Figure 7:
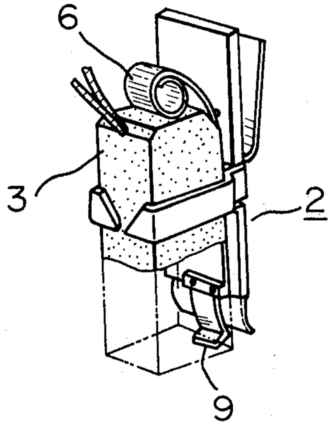
FIG. 7 is a partly-removed perspective view of an essential portion of a detachable holder part.
Figure 8:
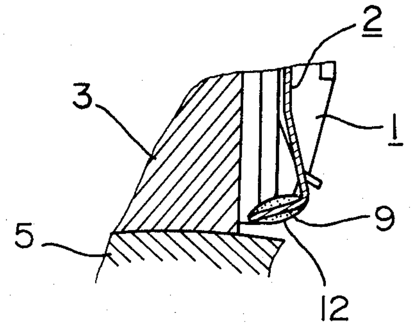
FIG. 8 is a sectional view of the portion of the detachable holder part around the retainer thereof.

FIGS. 6 and 7 show another kind of brush holder embodying the present invention. The detaching of brush 3, as well as the construction of the brush holder itself, is not described here because it does not constitute any essential part of the invention. (A reference shall be made, if necessary, to Japanese Patent Laid-open No. 162859). The retainer 9 is provided also in this brush holder. An effect equivalent to that of the first invention is obtainable by coating the end portion of the retainer 9 by the coating layer 12 as shown in FIG. 8.

Figure 9:
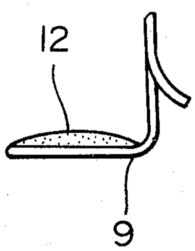
FIG. 9 is a side elevational view of another example of the retainer.

In the foregoing embodiments, the coating layer is formed on the entire periphery of the brush clamping portion of the retainer 9 and thereabout. This is because the brush holders are oriented in various postures when a multiplicity of holders are arranged around the collector such as upright, horizontal or upside down depending on the mounting positions. Namely, the coating layer in the described embodiments is effective in preventing the deposition of the powders or the like in whatever posture the brush holder may be mounted, because the coating layer is formed on the whole periphery of the retainer. However, in the case where the brush holder is mounted always in a predetermined direction, e.g. in the vertical posture, the coating film may be formed only on the portion of the retainer where the deposition of the powders is heavy, i.e. only on the upper side of the retainer, as shown in FIG. 9.

By forming the coating film with an electrically insulating material, the film is freed from the influence of the magnetic field produced by the electric current in the brushes. Namely, the tendency of attaching of magnetic powders such as iron powders contained by the dust particles, as well as the grounded brush material, is further suppressed advantageously.

As has been described, according to the invention, there is provided a brush holder of the type having a detachable holder part provided with a retainer for retaining the brush therein during handling, wherein the brush retaining portion and thereabout of the retainer is coated by a coating film of a material having a friction coefficient smaller than that of the retainer material. Therefore, the undesirable attaching and deposition of the powders on such portion of the retainer is largely avoided thanks to the slippery nature of the retainer surface, even if the powders of brush material are generated at a high rate. Namely, the powders are allowed to drop from the retainer before it grows to a massive lump, in contrast to the conventional brush holder in which large lump of powder drops from the retainer onto the sliding portion.

According to the invention, therefore, it is possible to eliminate such unfavourable phenomena as jumping of the brush, sparking and cracking of sliding parts of the brush.

What is claimed is:

1. A brush holder for detachably holding a brush adapted to slide on the surface of a rotary electricity collector of a dynamo-electric machine, said brush holder having a stationary holder part stationarily fixed to the stationary part of said dynamo-electric machine, and a detachable holder part detachably secured to said stationary holder part for holding the brush after separation from said stationary holder part, said detachable holder part being provided with a retainer for clamping and retaining said brush when separated from said stationary holder part and for releasing said brush when attached to said stationary holder part, said retainer being constructed so as to be disposed near the sliding surface of the brush when the detachable holder part is secured to the stationary holder part, characterized by comprising a coating film coating the entire surface of the brush clamping portion and thereabout of said retainer and made of an electrically insulating material having a coefficient of friction smaller than that of the material of said retainer, whereby undesirable accumulations of powders on said retainer are avoided.

2. A brush holder as claimed in claim 1, wherein said coating film is formed to have a rounded surface.

3. A brush holder as claimed in claim 1, wherein said coating film is made of an ethylene tetrafluoride resin.

4. A brush holder as claimed in claim 1, wherein said retainer is L-shaped.

5. A brush holder as claimed in claim 4, wherein said coating film is formed to have a rounded surface.

6. A brush holder as claimed in claim 1, wherein said detachable holder part is a substantially U-shaped support member and said retainer is formed as a substantially L-shaped free end of each leg of the support member.

7. A brush holder as claimed in claim 6, wherein said coating film is formed to have a rounded surface.

* * * * *